United States Patent
Chen et al.

(10) Patent No.: US 12,413,756 B2
(45) Date of Patent: Sep. 9, 2025

(54) MERGE WITH MOTION VECTOR DIFFERENCE

(71) Applicant: Tencent America LLC, Palo Alto, CA (US)

(72) Inventors: Lien-Fei Chen, Hsinchu (TW); Guichun Li, San Jose, CA (US); Xin Zhao, Santa Clara, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 77 days.

(21) Appl. No.: 18/240,981

(22) Filed: Aug. 31, 2023

(65) Prior Publication Data

US 2024/0129505 A1    Apr. 18, 2024

Related U.S. Application Data

(60) Provisional application No. 63/413,494, filed on Oct. 5, 2022.

(51) Int. Cl.
| | |
|---|---|
| *H04N 19/44* | (2014.01) |
| *H04N 19/105* | (2014.01) |
| *H04N 19/176* | (2014.01) |
| *H04N 19/513* | (2014.01) |
| *H04N 19/70* | (2014.01) |

(52) U.S. Cl.
CPC ........... *H04N 19/44* (2014.11); *H04N 19/105* (2014.11); *H04N 19/176* (2014.11); *H04N 19/513* (2014.11); *H04N 19/70* (2014.11)

(58) Field of Classification Search
CPC .................... H04N 19/44; H04N 19/105
See application file for complete search history.

(56) References Cited

U.S. PATENT DOCUMENTS

| | | | |
|---|---|---|---|
| 2020/0389656 A1* | 12/2020 | Huang | H04N 19/189 |
| 2021/0014522 A1* | 1/2021 | Jung | H04N 19/176 |
| 2021/0274214 A1* | 9/2021 | Moon | H04N 19/46 |

(Continued)

OTHER PUBLICATIONS

High Efficiency Video Coding, Rec. ITU-T H.265 v4 Dec. 2016, pp. 1-664.

(Continued)

*Primary Examiner* — Irfan Habib
(74) *Attorney, Agent, or Firm* — ArentFox Schiff LLP

(57) ABSTRACT

In some examples, an apparatus for video decoding includes receiving circuitry and processing circuitry. The processing circuitry receives coded information of a current block in a current picture from a coded video bitstream. The coded information includes a syntax element with a value indicative of a merge with motion vector difference (MMVD) mode being applied on the current block. The processing circuitry determines, in response to a motion vector predictor of a merge candidate being a bi-predictor, whether the merge candidate for the current block satisfies a requirement for applying a bi-prediction motion refinement. The processing circuitry can constrain the merge candidate for use in the MMVD mode when the merge candidate for the current block satisfies the requirement. Then, the processing circuitry reconstructs the current block in the MMVD mode with the merge candidate being constrained for use in the MMVD mode.

18 Claims, 11 Drawing Sheets

(56) References Cited

U.S. PATENT DOCUMENTS

| | | | | |
|---|---|---|---|---|
| 2022/0210438 A1* | 6/2022 | Chen | ................... | H04N 19/172 |
| 2022/0248047 A1* | 8/2022 | Chen | ................... | H04N 19/52 |
| 2022/0417500 A1* | 12/2022 | Huang | ................ | H04N 19/176 |
| 2023/0117308 A1* | 4/2023 | Huang | ................... | H04N 19/14 |
| | | | | 375/240.02 |
| 2023/0247216 A1* | 8/2023 | Huang | ................... | H04N 19/44 |
| | | | | 375/240.15 |
| 2024/0146945 A1* | 5/2024 | Xiu | ..................... | H04N 19/132 |
| 2024/0314349 A1* | 9/2024 | Deng | .................. | H04N 19/577 |
| 2024/0364904 A1* | 10/2024 | Kang | .................... | H04N 19/44 |

OTHER PUBLICATIONS

ITU-T and ISO/IEC, "Versatile Video Coding", ITU-T Rec. H.266 and ISO/IEC 23090-3, 2020, pp. 1-516.

A. Browne, Y. Ye, and S. H. Kim, "Algorithm description for Versatile Video Coding and Test Model 17 (VTM17)", ISO/IEC JTC1/SC/29/WG5 JVET-Z2002, Apr. 2022, pp. 1-130.

M. Salehifar, Y. He, K. Zhang, N. Zhang, and L. Zhang, "EE2-related: On MMVD and Affine MMVD Extension," ISO/IEC JTC1/SC29 JVET-Z0142, Apr. 2022, pp. 1-3.

M. Coban, et al., "Algorithm description of Enhanced Compression Model 5 (ECM5)", ISO/IEC JTC1/SC29 JVET-Z2025, Apr. 2022, pp. 1-45.

International Search Report and Written Opinion issued in International Application No. PCT/US2023/073478, mailed Feb. 6, 2024, 13 pages.

* cited by examiner

MERGE WITH MOTION VECTOR DIFFERENCE

INCORPORATION BY REFERENCE

The present application claims the benefit of priority to U.S. Provisional Application No. 63/413,494, "Improvement of Merge With Motion Vector Difference" filed on Oct. 5, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes receiving circuitry and processing circuitry. The processing circuitry receives coded information of a current block in a current picture from a coded video bitstream. The coded information includes a syntax element with a value indicative of a merge with motion vector difference (MMVD) mode being applied on the current block. The processing circuitry determines, in response to a motion vector predictor of a merge candidate being a bi-predictor, whether the merge candidate for the current block satisfies a requirement for applying a bi-prediction motion refinement. The processing circuitry can constrain the merge candidate for use in the MMVD mode when the merge candidate for the current block satisfies the requirement. Then, the processing circuitry reconstructs the current block in the MMVD mode with the merge candidate being constrained for use in the MMVD mode.

In some examples, the requirement for the bi-prediction motion refinement comprises at least one of a first set of conditions for a decoder side motion vector refinement (DMVR) and a second set of conditions for a bi-directional optical flow (BDOF) refinement.

To constrain the merge candidate for use in the MMVD mode, in some examples, the processing circuitry leaves the merge candidate out of a base candidate list of the MMVD mode when the merge candidate satisfies the requirement. The base candidate list of the MMVD mode is used to determine a starting point for the MMVD mode.

In an example, the processing circuitry adds the merge candidate into the base candidate list of the MMVD mode when the merge candidate fails to satisfy the requirement. In an example, the processing circuitry adds the merge candidate into the base candidate list of the MMVD mode as a uni-prediction MMVD candidate when the merge candidate is a uni-predictor. In an example, the processing circuitry adds the merge candidate into the base candidate list of the MMVD mode as a one sided bi-prediction MMVD candidate when the merge candidate is a bi-predictor and satisfies the requirement.

In some examples, the merge candidate is a regular merge candidate from a regular merge candidate list of a merge mode, the regular merge candidate list includes a plurality of regular merge candidates. The processing circuitry respectively tests the plurality of regular merge candidates for adding into the base candidate list for the MMVD mode. In an example, the processing circuitry determines that the base candidate list has fewer candidates than a preset number after the testing, and adds zero motion vector as a two sided bi-prediction MMVD candidate into the base candidate list. In another example, the processing circuitry determines that the base candidate list has fewer candidates than a preset number after the testing, and adds the merge candidate that is a bi-predictor and satisfies the requirement into the base candidate list. In an example, the processing circuitry adds the merge candidate as a two sided bi-prediction MMVD candidate. In another example, the processing circuitry adds the merge candidate as a one sided bi-prediction MMVD candidate.

In an example, the processing circuitry adds the merge candidate behind other candidates in the base candidate list.

To reconstruct the current block, in some examples, the processing circuitry determines a selected base from a base candidate list of the MMVD mode, determines a first MV offset in response to the selected base is a two sided bi-prediction MMVD candidate; and determines a second MV offset in response to the selected base is a one sided bi-prediction MMVD candidate or a uni-prediction MMVD candidate. The second MV offset is different from the first MV offset.

To reconstruct the current block, in some examples, the processing circuitry determines a selected base from a base candidate list of the MMVD mode, and determines a first MV offset according to a first table in response to the selected base is a two sided bi-prediction MMVD candidate, the first table stores first MV offsets associated with distance indices. The processing circuitry can determines a second MV offset according to a second table in response to the selected base is a one sided bi-prediction MMVD candidate or a uni-prediction MMVD candidate, the second table stores second MV offsets associated with the distance indices.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
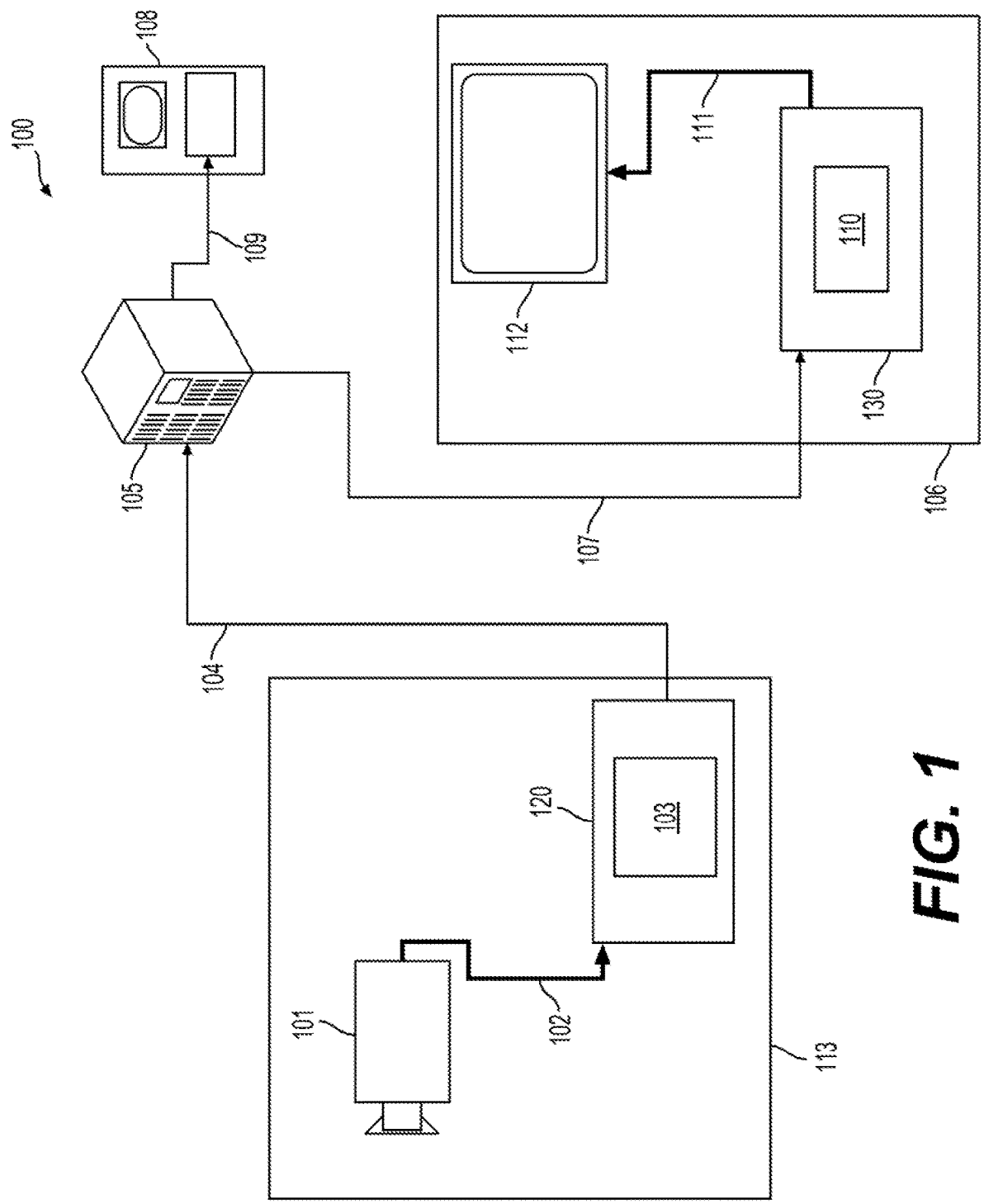
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
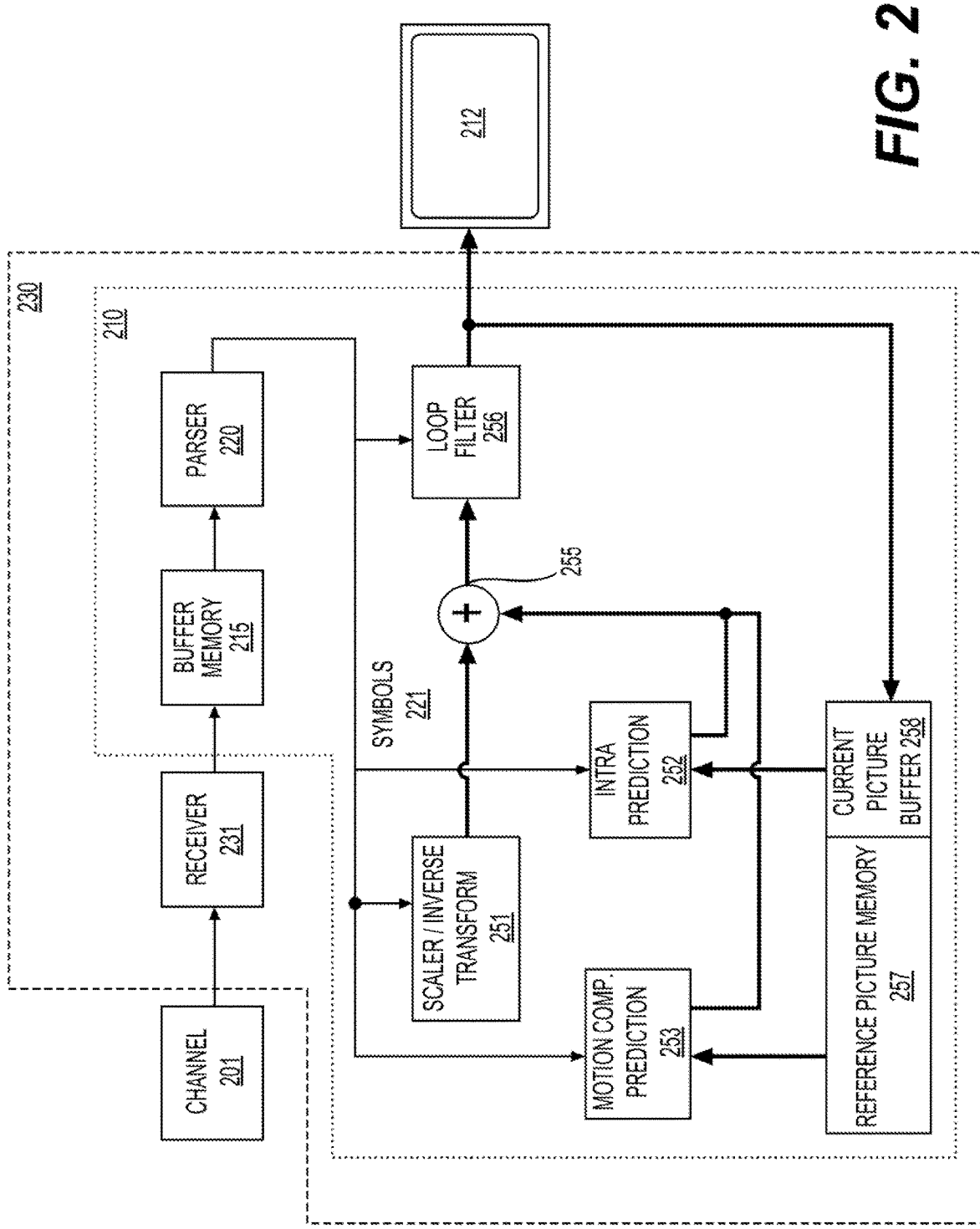
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
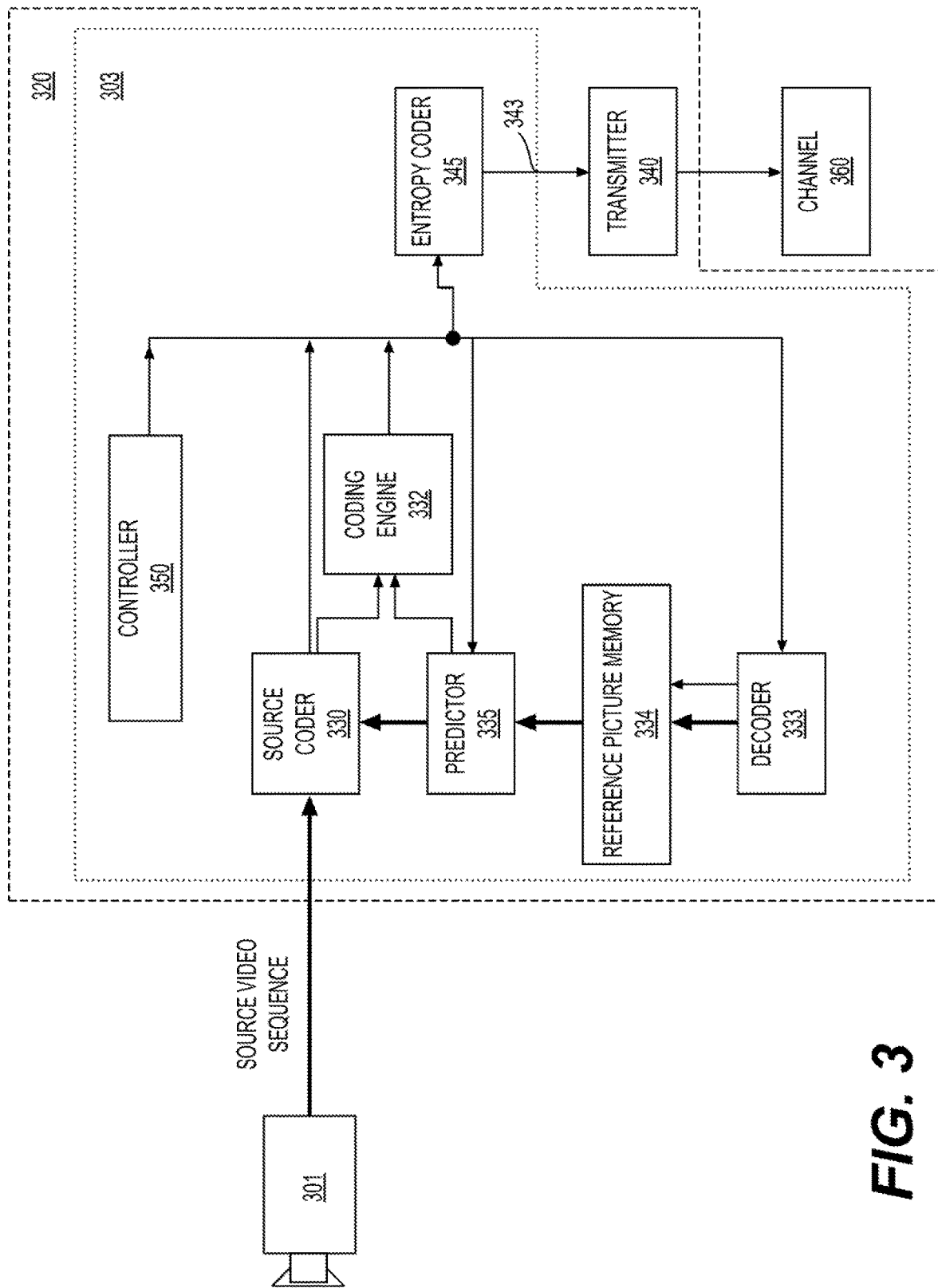
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for use with an inter prediction mode that is referred to as merge with motion vector difference (MMVD), and improve coding performance.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

Figure 4:
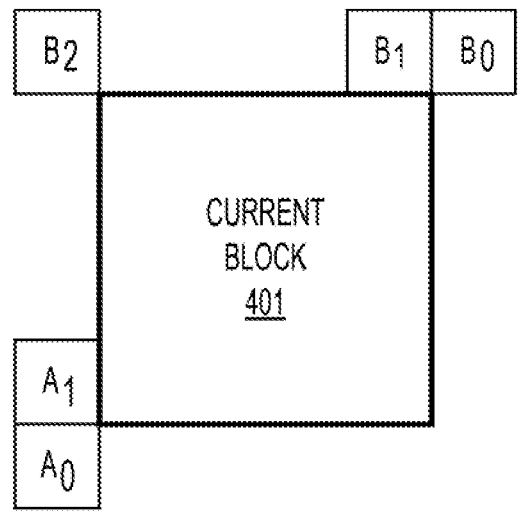
FIG. 4 shows positions of spatial merge candidates according to an embodiment of the disclosure.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

Figure 5:
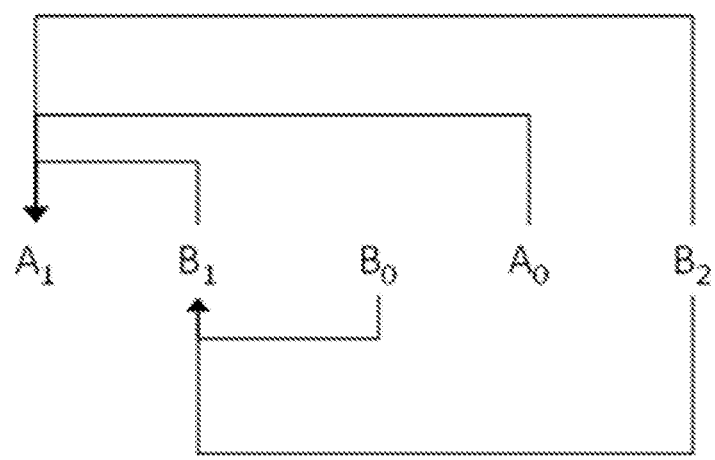
FIG. 5 shows candidate pairs that are considered for a redundancy check of spatial merge candidates according to an embodiment of the disclosure.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
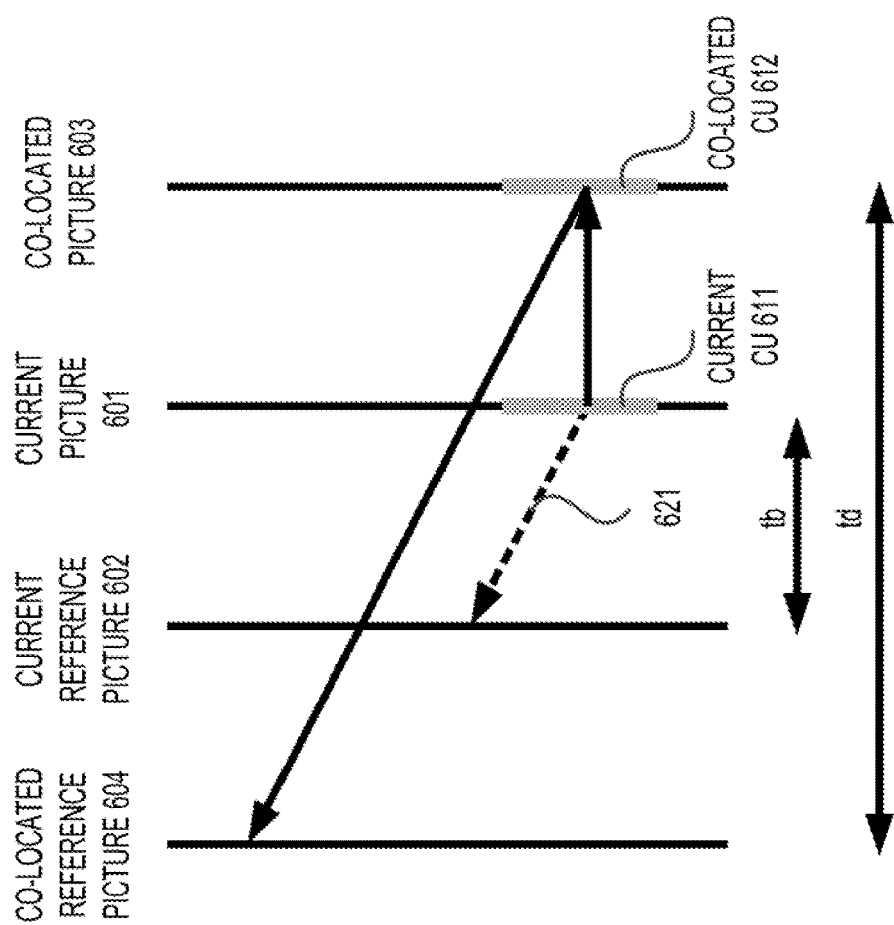
FIG. 6 shows exemplary motion vector scaling for a temporal merge candidate.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero.

Figure 7:
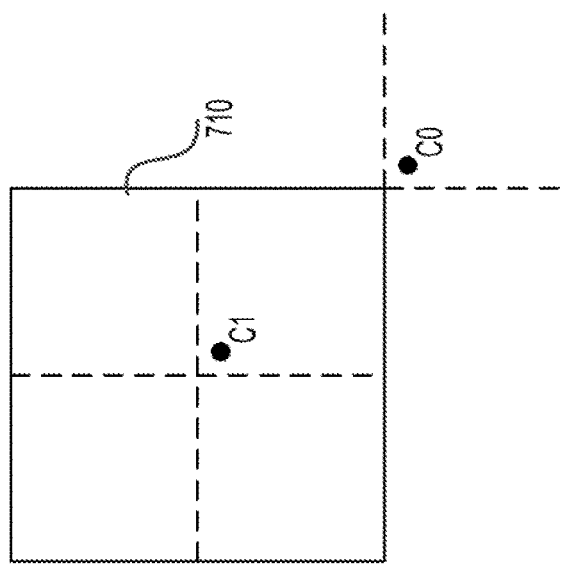
FIG. 7 shows exemplary candidate positions for a temporal merge candidate of a current CU.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

In the merge mode, in some examples, implicitly derived motion information can be used to predict samples of a CU (e.g., a current CU). In some examples, a merge with motion vector difference (MMVD) mode is used, such as in VVC. MMVD mode is used for either skip or merge modes with a motion vector expression method. In some examples, a MMVD merge flag can be signaled to specify whether the MMVD mode is used for the CU, for example, after signaling a regular merge flag (e.g., a skip flag or a merge flag).

In MMVD, after selecting a merge candidate from a regular merge list, the merge candidate is further refined by the signaled MVDs information. In some examples, MMVD re-uses merge candidate from the regular merge list. Among the merge candidates in the regular merge list, a candidate can be selected, and is further expanded by the motion vector expression method. MMVD provides motion vector expression with simplified signaling. In some examples, the motion vector expression method includes starting point, motion magnitude, and motion direction.

In some examples (e.g., VVC), MMVD technique can use a merge candidate list to select the candidate for the starting point. However, in an example, only candidates which are default merge type (MRG_TYPE_DEFAULT_N) are considered for MMVD's expansion.

In some examples, a base candidate index is used to define the starting point. The base candidate index indicates the best candidate among candidates in the list as shown in Table 1. For example, the list is a merge candidate list with motion vector predictors (MVP). The base candidate index can indicate the best candidate in the merge candidate list.

TABLE 1

A example of a base candidate index (IDX)

| Base candidate IDX | 0 | 1 | 2 | 3 |
|---|---|---|---|---|
| $N^{th}$ MVP | $1^{st}$ MVP | $2^{nd}$ MVP | $3^{rd}$ MVP | $4^{th}$ MVP |

It is noted that in an example, the number of base candidate is equal to 1, then base candidate IDX is not signaled.

In the MMVD mode, after a merge candidate (also referred to as an MV basis or an MV starting point) is selected, the merge candidate can be refined by additional information, such as signaled MVD information. The additional information can include an index (such as a distance index, e.g., mmvd_distance_idx[x0][y0]) used to specify a motion magnitude and an index (such as a direction index, e.g., mmvd_direction_idx[x0][y0]) used to indicate a motion direction. In some examples, in the MMVD mode, one of the first two candidates in the (regular) merge list can be selected as an MV basis. For example, a merge candidate flag (e.g., mmvd_cand_flag[x0][y0]) indicates the one of the first two candidates in the merge list. The merge candidate flag can be signaled to indicate (e.g., specify) which one of the first two candidates is selected. The additional information can indicate a MVD (or a motion offset) to the MV basis. For example, the motion magnitude indicates a magnitude of the MVD, the motion direction indicates a direction of the MVD.

Figure 8:
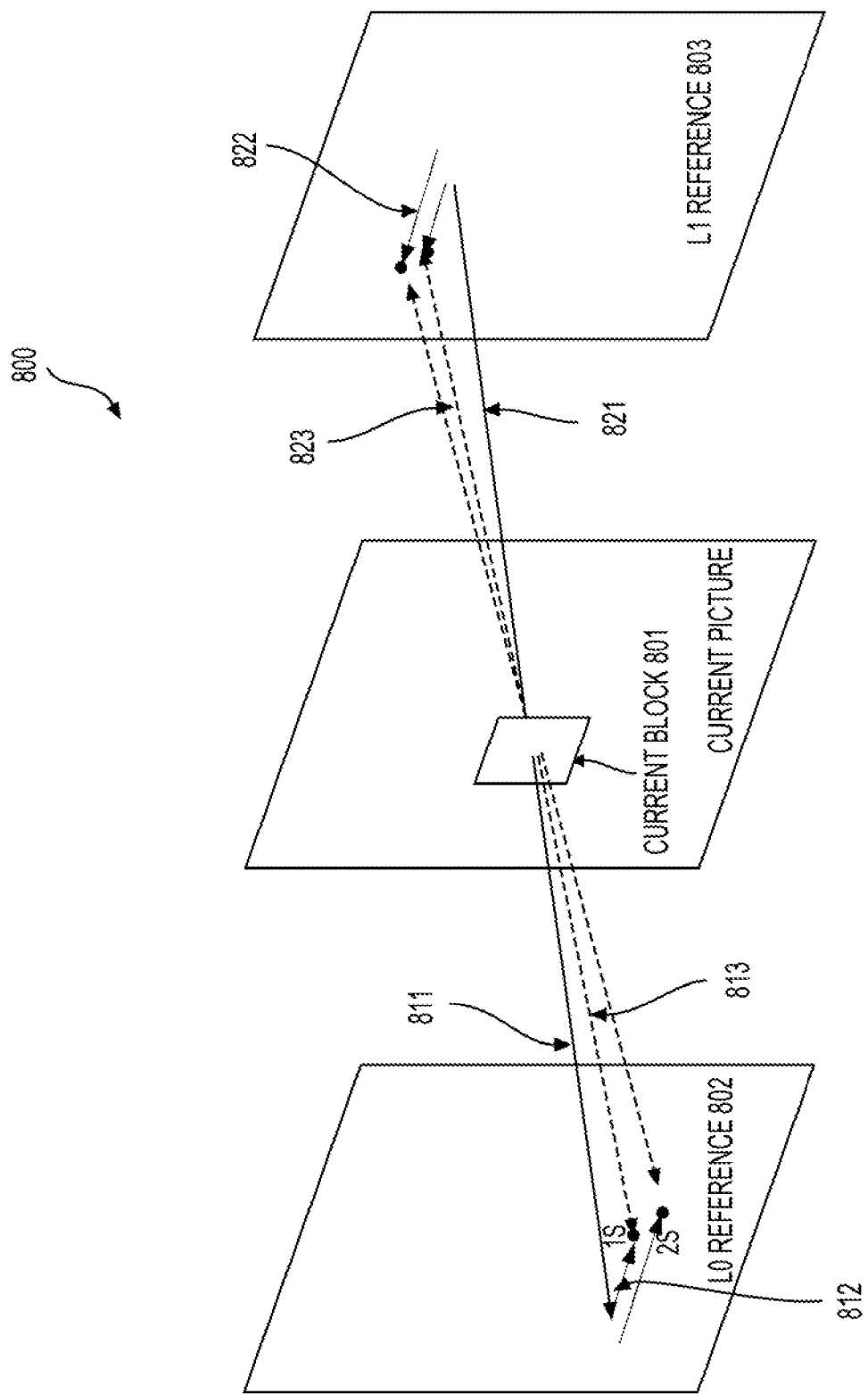
FIG. 8 shows an example of a search process in a merge with motion vector difference (MMVD) mode.

In an example, the merge candidate selected from the merge candidate list is used to provide the starting point or the MV starting point at a reference picture. A motion vector of the current block can be expressed with the starting point and a motion offset (or MVD) including a motion magnitude and a motion direction with respect to the starting point. At an encoder side, selection of the merge candidate and determination of the motion offset can be based on a search process (an evaluation process), such as shown in FIG. 8. At a decoder side, the selected merge candidate and the motion offset can be determined based on signaling from the encoder side.

Figure 9:
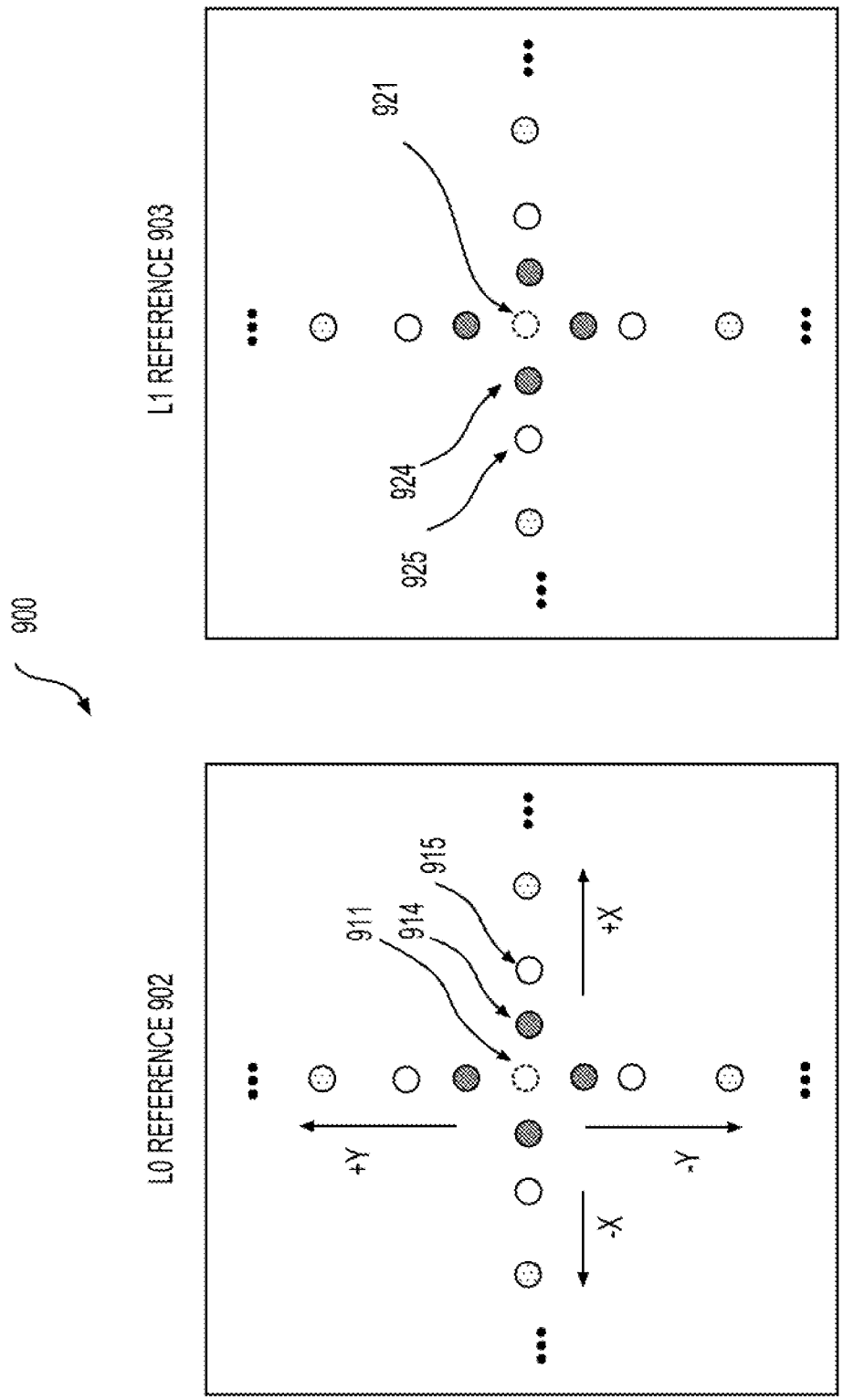
FIG. 9 shows examples of search points in a merge with motion vector difference (MMVD) mode.

FIG. 8 shows an example of a search process (800) in a MMVD mode. FIG. 9 shows examples of search points in a MMVD mode. In some examples, a subset or an entire set of the search points in FIG. 9 are used in the search process (800) in FIG. 8. By performing the search process (800), for example, at the encoder side, the additional information including the merge candidate flag (e.g., mmvd_cand_flag [x0][y0]), the distance index (e.g., mmvd_distance_idx[x0][y0]), and the direction index (e.g., mmvd_direction_idx[x0][y0]) can be determined for a current block (801) in a current picture (or a current frame).

A first motion vector (811) and a second motion vector (821) belonging to a first merge candidate are shown. The first motion vector (811) and the second motion vector (821) are MV starting points used in the search process (800). The first merge candidate can be a merge candidate on a merge candidate list constructed for the current block (801). The first and second motion vectors (811) and (821) can be associated with two reference pictures (802) and (803) in reference picture lists L0 and L1, respectively. Referring to FIGS. 8-9, the first and second motion vectors (811) and (821) can point to two starting points (911) and (921) in the reference pictures (802) and (803), respectively, as shown in FIG. 9.

Referring to FIG. 9, the two starting points (911) and (921) in FIG. 9 can be determined at the reference pictures (802) and (803). In an example, based on the starting points (911) and (921), multiple predefined points extending from the starting points (911) and (921) in vertical directions (represented by +Y, or −Y) or horizontal directions (represented by +X and −X) in the reference pictures (802) and (803) can be evaluated. In one example, a pair of points mirroring each other with respect to the respective starting point (911) or (921), such as the pair of points (914) and (924) (e.g., indicated by a shift of 1S in FIG. 8), or the pair of points (915) and (925) (e.g., indicated by a shift of 2S in FIG. 8), can be used to determine a pair of motion vectors (e.g., MVs (813) and (823) in FIG. 8) for the current block (801). The motion vectors (e.g., MVs (813) and (823) in FIG. 8) determined based on the predefined points surrounding the starting points (911) or (921) can be evaluated.

The distance index (e.g., mmvd_distance_idx[x0][y0]) can specify motion magnitude information and indicate a pre-defined offset (e.g., 1S or 2S in FIG. 8) from the starting point that is indicated by the merge candidate flag. It is noted that the predefined offset is also referred to as MMVD step in an example.

Referring to FIG. 8, an offset (e.g., a MVD (812) or a MVD (822)) can be applied (e.g., added) to a horizontal component or a vertical component of the starting MV (e.g., the MV (811) or (821)). An exemplary relationship of the distance index (IDX) and the pre-defined offset is specified in Table 2. When a full-pel MMVD is off, for example, a full-pel MMVD flag (e.g., slice_fpel_mmvd_enabled_flag) is equal to 0, a range of MMVD pre-defined offsets can be from ¼ luma samples to 32 luma samples. When the full-pel MMVD is off, the pre-defined offset can have a non-integer value, such as a fraction of a luma sample (e.g., ¼ pixel or ½ pixel). When the full-pel MMVD is on, for example, the full-pel MMVD flag (e.g., slice_fpel_mmvd_enabled_flag) is equal to 1, the range of MMVD pre-defined offsets can be from 1 luma sample to 128 luma samples. In an example, when the full-pel MMVD is on, the pre-defined offset only has an integer value, such as one or more luma samples.

TABLE 2

An exemplary relationship of a distance index
and an offset (e.g., a pre-defined offset)

| Distance IDX | 0 | 1 | 2 | 3 | 4 | 5 | 6 | 7 |
|---|---|---|---|---|---|---|---|---|
| Offset (in unit of luma sample) Full-pel MMVD off | ¼ | ½ | 1 | 2 | 4 | 8 | 16 | 32 |
| Offset (in unit of luma sample) Full-pel MMVD on | 1 | 2 | 4 | 8 | 16 | 32 | 64 | 128 |

The direction index can represent a direction (or a motion direction) of the MVD relative to the starting point. In an example, the direction index represents one of the four directions shown in Table 3. The meaning of MVD sign(s) in Table 3 can vary according to information of starting MV(s). In an example, when the starting MV is a uni-prediction MV or the starting MVs are bi-prediction MVs with both reference lists point to a same side of the current picture (e.g., POCs of two reference pictures are both larger than a POC of the current picture or the POCs of the two reference pictures are both smaller than the POC of the current picture), the MVD sign(s) in Table 3 specifies the sign of the MV offset (or the MVD) that is added to the starting MV.

When the starting MVs are the bi-prediction MVs with the two MVs pointing to different sides of the current picture (e.g., the POC of one reference picture is larger than the POC of the current picture, and the POC of the other reference picture is smaller than the POC of the current picture), the MVD sign in Table 3 specifies the sign of the MV offset (or the MVD) added to the list0 MV component of the starting MV and the MVD sign for the list1 MV has an opposite value. Referring to FIG. 8, the starting MVs (811) and (821) are the bi-prediction MVs with the two MVs (811) and (821) point to different sides of the current picture. The POC of the L1 reference picture (803) is larger than the POC of the current picture, and the POC of the L0 reference picture (802) is smaller than the POC of the current picture. The MVD sign (e.g., the sign "+" for the x-axis) indicated by the direction index (e.g., 00) in Table 3 specifies the sign (e.g., the sign "+" for the x-axis) of the MVD (e.g., the MVD (812)) added to the list0 MV component of the starting MV (e.g., (811)) and the MVD sign of the MVD (822) for the list1 MV component of the starting MV (e.g., (821)) has an opposite value, such as a sign "−" that is opposite to the sign "+" of the MVD (812).

Referring to Table 3, the direction index 00 indicates a positive direction in the x-axis, the direction index 01 indicates a negative direction in the x-axis, the direction index 10 indicates a positive direction in the y-axis, and the direction index 11 indicates a negative direction in the y-axis.

TABLE 3

An exemplary relationship between a sign
of an MV offset and a direction index

| Direction IDX | 00 | 01 | 10 | 11 |
|---|---|---|---|---|
| x-axis | + | − | N/A | N/A |
| y-axis | N/A | N/A | + | − |

In some examples, the MVD can be scaled according to the difference of POCs in each direction. In an example, when the differences of POCs in both lists are the same, no scaling is needed. Otherwise, when the difference of POC in list0 is larger than the one of list1, the MVD for list1 is scaled, by defining the POC difference of L0 as td and POC difference of L1 as tb, described with reference to FIG. 6. If the POC difference of L1 is greater than L0, the MVD for list0 is scaled in a similar way. When the starting MV is uni-predicted, the MVD is added to the available MV.

In some examples, one sided MMVD position is added for the bi-prediction cases. For the one-sided MMVD (also referred to as affine MMVD), individual MVD can be used for each list independently. In an example, a non-zero MVD is applied for listX (X is 0 or 1), and a zero MVD is applied for list(1-X). In some examples, all possible MMVD candidates can be reordered according to the template-matching cost in an ascending order.

In some examples, MMVD flag is signaled right after sending a skip flag and merge flag. If skip and merge flag is true, MMVD flag is parsed. If MMVD flag is equal to 1, MMVD syntaxes are parsed.

In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 10:
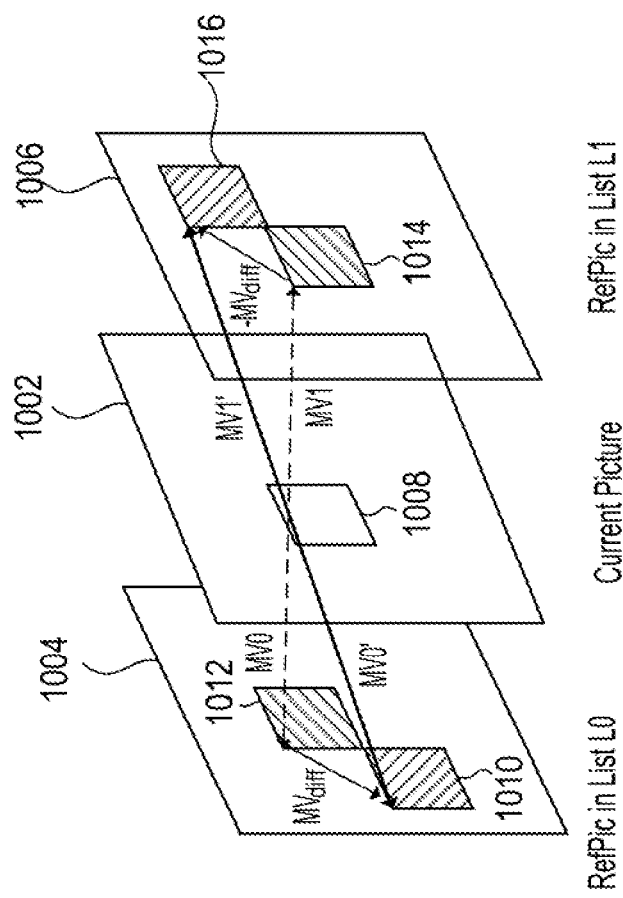
FIG. 10 shows an exemplary schematic view of a decoder side motion vector refinement.

FIG. 10 shows an exemplary schematic view of a BM-based decoder side motion vector refinement. As show in FIG. 10, a current picture (1002) can include a current block (1008). The current picture can include a reference picture list L0 (1004) and a reference picture list L1 (1006). For the current block (1008), an initial reference block (1012) in the reference picture list L0 (1004) can be located according to an initial motion vector MV0 and an initial reference block (1014) in the reference picture list L1 (1006) can be located according to an initial motion vector MV1. A searching process can be performed around the initial MV0 in the reference picture list L0 (1004) and the initial MV1 in the reference picture list L1 (1006). For example, a first candidate reference block (1010) can be identified in the reference picture list L0 (1004) and a first candidate reference block (1016) can be identified in the reference picture list L1 (1006). A SAD between candidate reference blocks (e.g., (1010) and (1016)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (1008).

In some examples (e.g., VVC), DMVR is implicitly applied at the block level without the need to signal side information in the bitstream. If a block satisfies certain conditions, the DMVR algorithm is invoked. For example, the conditions (also referred to as requirement for DMVR or a set of conditions for DMVR) can include:
(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) BCW weight index indicates equal weight, (8) weighted prediction (WP) is not enabled for the current block, and (9) CIIP mode is not used for the current block.

In some examples (e.g., VVC), decoder side motion vector refinement (DMVR) is applied to CU coded in regular merge mode. The pair of MVs obtained from the regular merge candidate is used as input of the DMVR process. DMVR applies the bilateral matching (BM) to refine the input MV pair $\{mv_{L0}, mv_{L1}\}$ and uses the refined MV pair $\{mv_{refinedL0}, mv_{refinedL1}\}$ for the motion compensated prediction of both luma and chroma components as shown in FIG. 10. The output MVs of DMVR can be referred to as refined MV pair, and can be represented by Eq. (1):

$$mv_{refinedL0} = mv_{L0} + \Delta mv$$

$$mv_{refinedL1} = mv_{L1} + \Delta mv \quad \text{Eq. (1)}$$

The motion vector difference Amy is applied to the input MV pair to obtain the refined MV pair by using the MVD mirroring property, because the input MV pair point to two different reference pictures that have equal difference in picture order count (POC) to the current picture and these two reference pictures are at different temporal direction.

In some examples, in DMVR, a luma coded block is divided into 16×16 subblocks for the MV refinement process. The Amy is derived independently for each subblocks in two steps, such as an integer precision motion search step (also referred to as integer sample offset search) followed by a fractional motion search step (also referred to as fractional sample offset search). Finally, the subblock motion compensation (MC) is applied using the refined MV pair $\{mv_{refinedL0}, mv_{refinedL1}\}$.

According to an aspect of the disclosure, in the integer precision motion search step of DMVR, the search space includes 25 MV pairs of candidates that can be represented by Eq. (2):

$$mv_{L0(i,j)} = mv_{L0(0,0)} + (i,j)$$

$$mv_{L1(i,j)} = mv_{L1(0,0)} - (i,j) \quad \text{Eq. (2)} =$$

where (i, j) represents the coordinate of the search point around the initial MV pair, and i and j are integer value between −2 and 2 inclusive in an example. In some examples, the SAD of the initial MV pair is first calculated and the SAD can be calculated according to Eq. (3):

$$SAD(i, j) = K \sum_{n=0}^{\frac{H}{2}} \sum_{m=0}^{W} \text{diff}_{m,n} \quad \text{Eq. (3)}$$

$$\text{diff}_{m,n} = \text{abs}(P0_{i,j}[m + i, 2n + j] - P1_{i,j}[m - i, 2n - j]) \text{ and}$$

$$K = \begin{cases} 3/4 & i = 0, j = 0 \\ 1 & \text{otherwise} \end{cases}$$

In Eq. (3), W and H denote the weight and height of the subblock, $P0_{i,j}[m+i, 2n+j]$ and $P1_{i,j}[m−i, 2n−j]$ denote the corresponding samples in the two reference pictures. When the SAD of the initial MV pair is smaller than a threshold, the integer precision motion search step of DMVR is terminated. Otherwise SADs of the remaining 24 points are calculated and checked for example in raster scanning order. The point with the smallest SAD is selected as the output of integer precision motion search step. In some examples, to reduce the penalty of the uncertainty of DMVR refinement, the original MV may be favored during the DMVR process. In an example, the SAD between the reference blocks referred by the initial MV candidates is decreased by ¼ of the SAD value, thus the initial MV candidates can be favored.

In the fractional motion search step (fractional sample offset search) in DMVR, the candidate MV pair selected in the integer precision motion search step (integer sample offset search step) is further refined. In some examples, to save the calculational complexity, the fractional sample refinement is derived by using parametric error surface equation, instead of additional search with SAD comparison. The fractional sample refinement is conditionally invoked based on the output of the integer sample offset search step. When the integer sample offset search step is terminated with center having the smallest SAD in either the first iteration or the second iteration search, the fractional sample refinement is further applied. In parametric error surface based sub-pixel offsets estimation, the center position cost and the costs at four neighboring positions from the center (e.g., in the first step of integer precision motion search) are used to fit a 2-D parabolic error surface equation, such as Eq. (4):

$$SAD(x,y) = \alpha(x - x_{min})^2 + \beta(y - y_{min})^2 + \gamma \quad \text{Eq. (4)}$$

where $(x_{min}, y_{min})$ corresponds to the fractional position with the least cost and y corresponds to the minimum cost value. Eq. (4) is fitted to 5 of the 25 SAD costs calculated in the first step in order to determine the 5 unknowns parameters, i.e., $\alpha, \beta, \gamma, x_{min}$, and $y_{min}$. By solving the Eq. (4) with the use of the cost values of the five search points, the $(x_{min}, y_{min})$ is computed, for example according to Eq. (5) and Eq. (6):

$$x_{min} = (E(-1,0) - E(1,0))/(2(E(-1,0) + E(1,0) - 2E(0,0))) \quad \text{Eq. (5)}$$

$$y_{min} = (E(0,-1) - E(0,1))/(2((E(0,-1) + E(0,1) - 2E(0,0))) \quad \text{Eq. (6)}$$

In Eq. (5) and Eq. (6), E(−1,0), E(1,0), E(1,0), E(0, −1) and E(0,0) denote the cost values at the 5 points. The value of $x_{min}$, and $y_{min}$ are automatically constrained to be between −8 and 8 since all cost values are positive and the smallest value is E(0,0). The constraints correspond to half pel offset with 1/16-th-pel MV accuracy in VVC. The computed fractional $(x_{min}, y_{min})$ can be added to the integer distance refinement MV to get the sub-pixel accurate refinement delta MV.

A technique that is referred to as bi-directional optical flow (BDOF) can be used for example in VVC. BDOF was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions (also referred to as requirement for BDOF, or a set of conditions for BDOF) as follows:

(1) The CU is coded using "true" bi-prediction mode, i.e., one of the two reference pictures is prior to the current picture in display order and the other is after the current picture in display order, (2) The distances (e.g., POC difference) from two reference pictures to the current picture are the same, (3) Both reference pictures are short-term reference pictures, (4) The CU is not coded using affine mode or the SbTMVP merge mode, (5) CU has more than 64 luma samples, (6) Both CU height and CU width are larger than or equal to 8 luma samples, (7) BCW weight index indicates equal weight, (8) Weighted prediction (WP) is not enabled for the current CU, and (9) CIIP mode is not used for the current CU.

In some examples, BDOF is only applied to a luma component. As the name of BDOF indicates, the BDOF mode can be based on an optical flow concept, which assumes that a motion of an object is smooth. For each 4×4 subblock, a motion refinement ($v_x$, $v_y$) can be calculated by minimizing a difference between L0 and L1 prediction samples. The motion refinement can then be used to adjust the bi-predicted sample values in the 4×4 subblock. BDOF can include steps as follows.

First, horizontal and vertical gradients, $$\frac{\partial I^{(k)}}{\partial x}(i, j) \text{ and } \frac{\partial I^{(k)}}{\partial y}(i, j), k = 0, 1,$$

of the two prediction signals from the reference list L0 and the reference list L1 can be computed by directly calculating a difference between two neighboring samples. The horizontal and vertical gradients can be provided in Eq. (7) and Eq. (8) as follows:

$$\frac{\partial I^{(k)}}{\partial x}(i, j) = \left(\left(I^{(k)}(i+1, j) \gg shift1\right) - \left(I^{(k)}(i-1, j) \gg shift1\right)\right) \quad \text{Eq. (7)}$$

$$\frac{\partial I^{(k)}}{\partial y}(i, j) = \left(\left(I^{(k)}(i, j+1) \gg shift1\right) - \left(I^{(k)}(i, j-1) \gg shift1\right)\right) \quad \text{Eq. (8)}$$

where $I^{(k)}$ (i,j) can be a sample value at coordinate (i,j) of the prediction signal in list k, k=0,1, and shift1 can be calculated based on a luma bit depth, bitDepth, as shift1=max(6, bitDepth−6).

Then, an auto- and cross-correlation of the gradients, $S_1$, $S_2$, $S_3$, $S_5$ and $S_6$, can be calculated according to Eqs. (9)-(13) as follows:

$$S_1 = \Sigma_{(i,j)\in\Omega} \text{Abs}(\psi_x(i,j)), \quad \text{Eq. (9)}$$

$$S_2 = \Sigma_{(i,j)\in\Omega} \psi_x(i,j) \cdot \text{Sign}(\psi_y(i,j)) \quad \text{Eq. (10)}$$

$$S_3 = \Sigma_{(i,j)\in\Omega} \theta(i,j) \cdot \text{Sign}(\psi_x(i,j)) \quad \text{Eq. (11)}$$

$$S_5 = \Sigma_{(i,j)\in\Omega} \text{Abs}(\psi_y(i,j)) \quad \text{Eq. (12)}$$

$$S_6 = \Sigma_{(i,j)\in\Omega} \theta(i,j) \cdot \text{Sign}(\psi_y(i,j)) \quad \text{Eq. (13)}$$

where $\psi_x$ (i,j), $\psi_y$ (i,j), and $\theta(i,j)$ can be provided in Eq. (14)-(16) respectively.

$$\psi_x(i, j) = \left(\frac{\partial I^{(1)}}{\partial x}(i, j) + \frac{\partial I^{(0)}}{\partial x}(i, j)\right) \gg n_a \quad \text{Eq. (14)}$$

$$\psi_y(i, j) = \left(\frac{\partial I^{(1)}}{\partial y}(i, j) + \frac{\partial I^{(0)}}{\partial y}(i, j)\right) \gg n_a \quad \text{Eq. (15)}$$

$$\theta(i, j) = \left(I^{(1)}(i, j) \gg n_b\right) - \left(I^{(0)}(i, j) \gg n_b\right) \quad \text{Eq. (16)}$$

where $\Omega$ can be a 6×6 window around the 4×4 subblock, and the values of $n_a$ and $n_b$ can be set equal to min (1, bitDepth−11) and min (4, bitDepth−8), respectively.

The motion refinement ($v_x$, $v_y$) can then be derived using the cross- and auto-correlation terms using Eqs. (17) and (18) as follows:

$$v_x = S_1 > 0 ? \text{clip3}(-th'_{BIO}, th'_{BIO}, -((S_3 \cdot 2^{nb-na}) \gg \lfloor \log_2 S_1 \rfloor)) : 0 \quad \text{Eq. (17)}$$

$$v_y = s_5 > 0 ? \text{clip3}(-th'_{BIO}, th'_{BIO}, -((s_6 \cdot 2^{nb-na} - ((v_x S_{2,m}) \ll n_{S_2} + v_x S_{2,s})/2) \gg \lfloor \log_2 S_{5} \rfloor)) : 0 \quad \text{Eq. (18)}$$

where $$S_{2,m} = S_2 \gg n_{S_2}, S_{2,s} = S_2 \& (2^{n_{S_2}} - 1), th'_{BIO} = 2^{\max(5, BD-7)} \cdot \lfloor \cdot \rfloor$$

is a floor function, and $n_{S_2}=12$. Based on the motion refinement and the gradients, an adjustment can be calculated for each sample in the 4×4 subblock based on Eq. (19):

$$b(x, y) = rnd\left(\left(v_x\left(\frac{\partial I^{(1)}(x, y)}{\partial x} - \frac{\partial I^{(0)}(x, y)}{\partial x}\right) + v_y\left(\frac{\partial I^{(1)}(x, y)}{\partial y} - \frac{\partial I^{(0)}(x, y)}{\partial y}\right) + 1\right)/2\right) \quad \text{Eq. (19)}$$

Finally, the BDOF samples of the CU can be calculated by adjusting the bi-prediction samples in Eq. (20) as follows:

$$\text{pred}_{BDOF}(x,y) = (I^{(0)}(x,y) + I^{(1)}(x,y) + b(x,y) + o_{offset}) \gg \text{shift} \quad \text{Eq. (20)}$$

Values can be selected such that multipliers in the BDOF process do not exceed 15-bits, and a maximum bit-width of the intermediate parameters in the BDOF process can be kept within 32-bits.

In some examples, sample based BDOF can be used instead of a block based BDOF.

In some examples, multi-pass DMVR can be used. In an example, in the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

It is noted that, in some examples, the MMVD flag is implicitly derived to be false and cannot not signaled when at least one of DMVR and BDOF is available for the coded picture. Then, MMVD cannot be used anymore for any CU in the examples, and coding loss exists because MMVD is forbidden.

Aspects of the disclosure provide techniques that allow MMVD to be used in coding a picture even when at least one of DMVR and BDOF is available for coding the picture. Further, in some examples, the techniques can diverse candidates for various coding schemes. For example, when a merge candidate of bi-predictor is qualified for DMVR or BDOF, the merge candidate is constrained from MMVD. Thus, more diversified coding schemes can be used to improve coding performance. In some examples, the MMVD signaling can be improved by checking the availability of the DMVR and BDOF of the base index of the MMVD.

It is noted that the techniques may be used separately or combined in any order. In following description, MMVD may refers to techniques of merge motion vector difference in the above description, or any variant. Similarly, in the following description, DMVR, BDOF, MP-DMVR, and sample-based BDOF, may refer to the techniques in the above description or any variant. Further, the techniques may be implemented by processing circuitry (e.g., one or more processors or one or more integrated circuits). In an example, the one or more processors execute a program that is stored in a non-transitory computer-readable medium.

According to some aspects of the disclosure, while MMVD is allowed when DMVR or BDOF is available for coding a picture, the base candidate selection for the MMVD mode is constrained, thus available coding schemes for coding the picture can be more diversified. In some examples, base candidates for MMVD mode are selected from regular merge candidate list. For a selection of a merge candidate from the regular merge candidate list for MMVD mode, the merge candidate is not used for MMVD mode when the MV predictor of the merge candidate is a bi-predictor and at least one of the bi-prediction motion refinement methods, e.g., DMVR or BDOF, could be applied on merge candidate. In other words, when a merge candidate satisfies the requirement for applying a bi-prediction motion refinement, the merge candidate is not selected for the MMVD mode.

In some embodiments, a base candidate list of MMVD can be formed based on the merge candidates in the regular merge candidate list by selecting one or more of the merge candidates in the regular merge candidate list. The candidates in the base candidate list can be used to determine a starting point for MMVD. The number of candidates in the base candidate list of MMVD is set to be N, N is a positive integer. In an example (e.g., VVC), N is 2. To form the base candidate list of MMVD, in an example, when a merge candidate in the regular merge candidate list satisfies a requirement for applying a bi-prediction motion refinement (e.g., being a bi-predictor and at least one of bi-prediction motion refinement methods, e.g. DMVR or BDOF could be applied), then the merge candidate will not be added into the base candidate list of MMVD.

In some embodiments, when the number of available base candidates for MMVD derivation is less than N, the zero MV for both reference lists (bi-prediction) may be added into the list as base candidate for MMVD derivation.

In some embodiments, when the number of available base candidates of MMVD derivation is less than N, then an MV predictor, that is a bi-predictor and at least one of bi-prediction motion refinement methods, e.g., DMVR or BDOF could be applied on the MV predictor, can be added into the list as a base candidate for MMVD derivation. In an example, the merge candidates in the regular merge candidate list can be checked. In a first round, when a merge candidate in the regular merge candidate list satisfies a requirement for applying a bi-prediction motion refinement (e.g., being a bi-predictor and at least one of bi-prediction motion refinement methods, e.g., DMVR or BDOF could be applied), then the merge candidate will not be added into the base candidate list of MMVD. After the first round, when the number of available base candidates in the base candidate list of MMVD is less than N, the merge candidate in the regular merge candidate list that satisfies the requirement for applying a bi-prediction motion refinement can be added into the base candidate list of MMVD.

According to another aspect of the disclosure, the construction of the MMVD candidate list for MMVD mode is constrained. In an example, a bi-prediction MMVD candidate with MMVD offset added to both reference lists (e.g., two-sided bi-prediction MMVD candidates) may not be used as MMVD candidate when at least one of the bi-prediction motion refinement methods, e.g., DMVR or BDOF, could be applied on the coding block.

According to another aspect of the disclosure, different definition of MV offset can be used for different type of MMVD candidates during the MMVD candidate list construction. In some examples, two definitions of the MV offset can be used. The first definition of the MV offset is used for two-sided bi-prediction MMVD candidates to both reference lists when at least one of the bi-prediction motion refinement methods, e.g. DMVR or BDOF, could be applied on the coding block, and the second definition of MV offset is used for one-sided bi-prediction MMVD candidates (with MV offset only added to one of the reference lists) or uni-prediction MMVD candidates. In some examples, MV offsets in the first definition (e.g., MV offsets of two-sided MMVD bi-prediction candidates) can start at larger values than the MV offsets in the second definition (e.g., MV offsets for one-sided bi-prediction MMVD candidates or uni-prediction MMVD). In an example, the relatively small MV offset can be realized by using DMVR and/or BDOF; and the relatively large MV offset can be realized by using MMVD.

In an example, the first definition of the MV offsets for two-sided bi-prediction MMVD candidates can use Table 4:

TABLE 4

| Distance IDX | 0 | 1 | 2 | 3 | 4 | 5 | 6 | 7 |
|---|---|---|---|---|---|---|---|---|
| Offset (in unit of luma sample) | p + ¼ | p + ½ | p + 1 | p + 2 | p + 4 | p + 8 | p + 16 | p + 32 |

In Table 4, p is a constant value and its typical value could be 4, or 8 according to the search range of motion refinement. The second definition of the MV offsets for one-sided bi-prediction MMVD candidates or uni-prediction MMVD can use Table 2. The MV offsets according to Table 4 is larger than the MV offsets according to Table 2.

Figure 11:
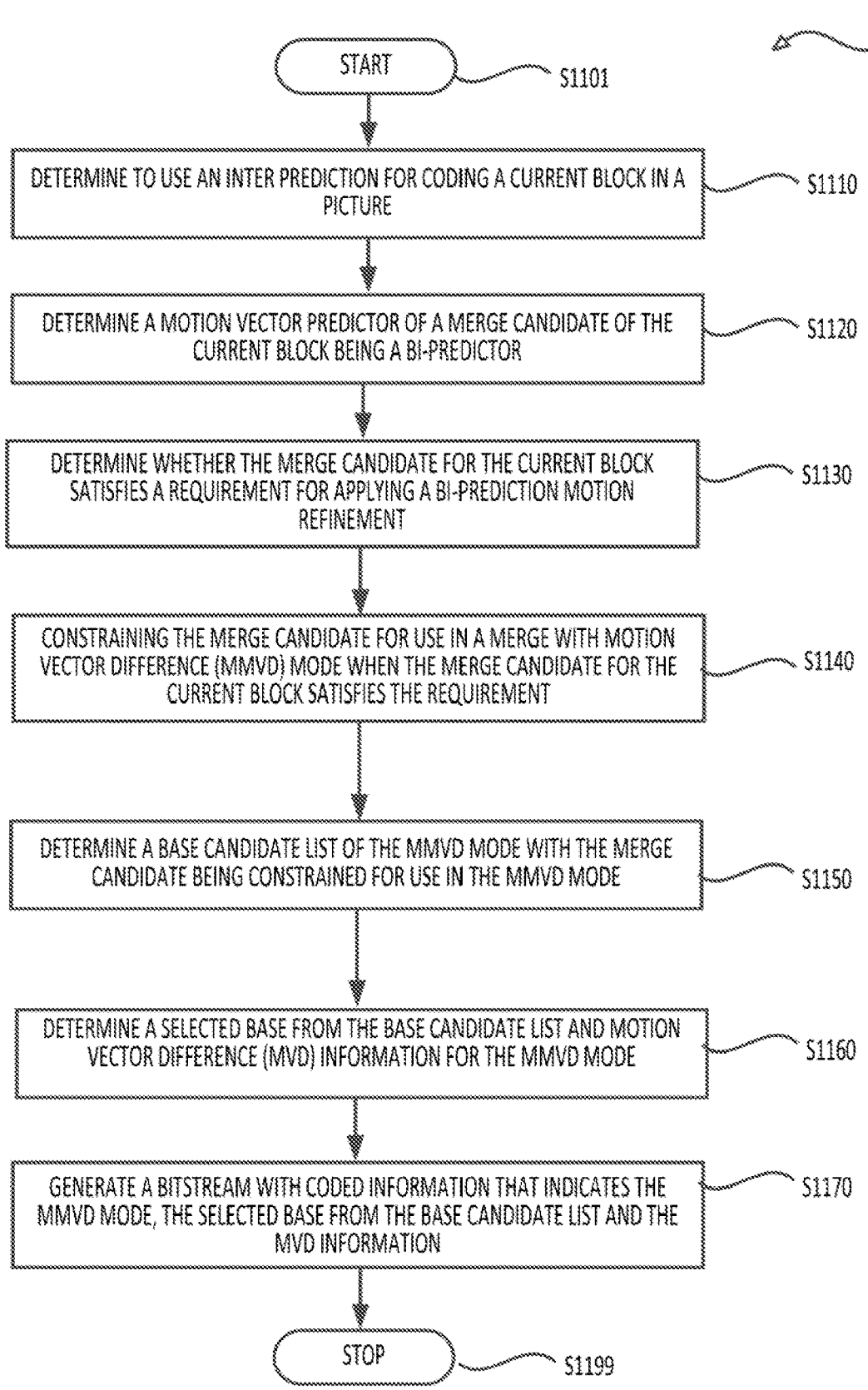
FIG. 11 shows a flow chart outlining a process according to some embodiment of the disclosure.

FIG. 11 shows a flow chart outlining a process (1100) according to an embodiment of the disclosure. The process (1100) can be used in a video encoder. In various embodiments, the process (1100) is executed by processing circuitry, such as the processing circuitry that performs functions of the video encoder (103), the processing circuitry that performs functions of the video encoder (303), and the like. In some embodiments, the process (1100) is implemented in software instructions, thus when the processing circuitry executes the software instructions, the processing circuitry performs the process (1100). The process starts at (S1101) and proceeds to (S1110).

At (S1110), an inter prediction is determined for coding a current block in a picture.

At (S1120), a motion vector predictor of a merge candidate of the current block is a bi-predictor.

At (S1130), whether the merge candidate for the current block satisfies a requirement for applying a bi-prediction motion refinement is determined. In some examples, the encoder needs to determine inter prediction techniques for use on the current block. In some examples, the encoder diversifies the inter prediction techniques, and determines a best one that can achieve lowest rate distortion cost. For example, when the bi-prediction motion refinement could be used on a merge candidate, the merge candidate may be constrained (e.g., excluded from) for MMVD, so that other merge candidate, for example other merge candidate that the bi-prediction motion refinement can not be applied on, can be used in MMVD. The requirement for applying the bi-prediction motion refinement can be at least one of the requirement for DMVR, and the requirement for BDOF.

At (S1140), the merge candidate is constrained for use in a merge with motion vector difference (MMVD) mode when the merge candidate for the current block is a bi-predictor and satisfies the requirement.

At (S1150), a base candidate list of the MMVD mode with the merge candidate being constrained for use in the MMVD mode is determined.

At (S1160), a selected base is determined from the base candidate list and motion vector difference (MVD) information for the MMVD mode. In some examples, the encoder can determine the selected base and the MVD information that can provide the lowest rate distortion cost among various inter prediction techniques.

At (S1170), a bitstream with coded information that indicates the MMVD mode, the selected base from the base candidate list and the MVD information is generated.

In some examples, the requirement for applying the bi-prediction motion refinement comprises at least one of a first set of conditions for applying a decoder side motion vector refinement (DMVR) and a second set of conditions for applying a bi-directional optical flow (BDOF) refinement.

In some examples, to constrain the merge candidate for use in the MMVD mode, the merge candidate is left out of (excluded from) the base candidate list of the MMVD mode when the merge candidate satisfies the requirement. The base candidate list of the MMVD mode is used to determine a starting point for the MMVD mode.

In some examples, the merge candidate is added into the base candidate list of the MMVD mode when the merge candidate fails to satisfy the requirement.

In some examples, the merge candidate is added into the base candidate list of the MMVD mode as a uni-prediction MMVD candidate when the merge candidate is a uni-predictor.

In some examples, the merge candidate is added into the base candidate list of the MMVD mode as a one sided bi-prediction MMVD candidate when the merge candidate is a bi-predictor and satisfies the requirement. For a one sided bi-prediction MMVD candidate, MVD is applied to MV of one of the reference pictures.

In some examples, the merge candidate is a regular merge candidate from a regular merge candidate list of a merge mode, the regular merge candidate list includes a plurality of regular merge candidates. The plurality of regular merge candidates are respectively tested for adding into the base candidate list for the MMVD mode. After the testing of the plurality of regular merge candidates, when the base candidate list has fewer candidates than a preset number, zero motion vector can be added as a two sided bi-prediction MMVD candidate into the base candidate list.

In some examples, after the testing of the plurality of regular merge candidates, when the base candidate list has fewer candidates than a preset number, the merge candidate that is a bi-predictor and satisfies the requirement is added into the base candidate list. In an example, the merge candidate is added as a two sided bi-prediction MMVD candidate. In another example, the merge candidate is added as a one sided bi-prediction MMVD candidate. In an example, the merge candidate is added behind other candidates in the base candidate list.

In some examples, the selected base (starting point) is determined from the base candidate list of the MMVD mode. In an example, a first MV offset is determined in response to the selected base is a two sided bi-prediction MMVD candidate. In another example, a second MV offset is determined in response to the selected base is a one sided bi-prediction MMVD candidate or a uni-prediction MMVD candidate. The second MV offset is different from the first MV offset. In an example, the first MV offset is larger than the second MV offset.

In an example, the first MV offset is determined according to a first table in response to the selected base is a two sided bi-prediction MMVD candidate, the first table storing first MV offsets associated with distance indices, such as Table 4. The second MV offset is determined according to a second table in response to the selected base is a one sided bi-prediction MMVD candidate or a uni-prediction MMVD candidate, the second table storing second MV offsets associated with the distance indices, such as Table 2.

Then, the process proceeds to (S1199) and terminates.

The process (1100) can be suitably adapted. Step(s) in the process (1100) can be modified and/or omitted. Additional step(s) can be added. Any suitable order of implementation can be used.

Figure 12:
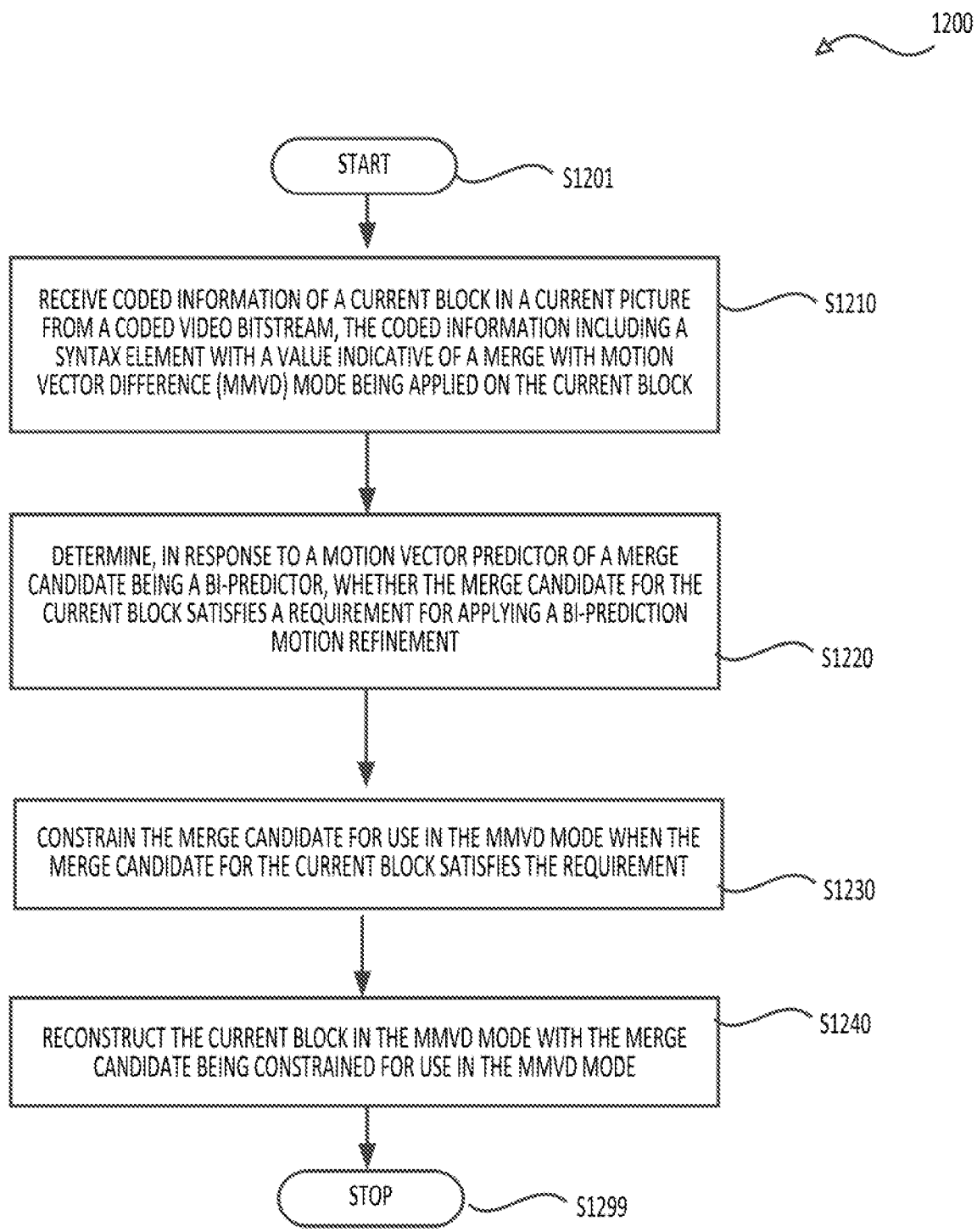
FIG. 12 shows a flow chart outlining another process according to some embodiment of the disclosure.

FIG. 12 shows a flow chart outlining a process (1200) according to an embodiment of the disclosure. The process (1200) can be used in a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process starts at (S1201) and proceeds to (S1210).

At (S1210), coded information of a current block in a current picture is received from a coded video bitstream. The coded information includes a syntax element with a value indicative of a merge with motion vector difference (MMVD) mode being applied on the current block.

At (S1220), in response to a motion vector predictor of a merge candidate being a bi-predictor, whether the merge candidate for the current block satisfies a requirement for applying a bi-prediction motion refinement is determined. In an example, the requirement is the requirement for DMVR. In another example, the requirement is the requirement for BDOF.

At (S1230), the merge candidate is constrained for use in the MMVD mode when the merge candidate for the current block satisfies the requirement.

At (S1240), the current block is reconstructed according to the MMVD mode with the merge candidate being constrained for use in the MMVD mode.

In some examples, the requirement for applying the bi-prediction motion refinement comprises at least one of a first set of conditions for applying a decoder side motion vector refinement (DMVR) and a second set of conditions for applying a bi-directional optical flow (BDOF) refinement.

In some examples, to constrain the merge candidate for use in the MMVD mode, the merge candidate is excluded from a base candidate list of the MMVD mode when the merge candidate satisfies the requirement. The base candidate list of the MMVD mode is used to determine a starting point for the MMVD mode.

In some examples, the merge candidate is added into the base candidate list of the MMVD mode when the merge candidate fails to satisfy the requirement.

In some examples, the merge candidate is added into the base candidate list of the MMVD mode as a uni-prediction MMVD candidate when the merge candidate is a uni-predictor.

In some examples, the merge candidate is added into the base candidate list of the MMVD mode as a one sided bi-prediction MMVD candidate when the merge candidate is a bi-predictor and satisfies the requirement. For a one sided bi-prediction MMVD candidate, MVD is applied to MV of one of the reference pictures.

In some examples, the merge candidate is a regular merge candidate from a regular merge candidate list of a merge mode, the regular merge candidate list includes a plurality of regular merge candidates. The plurality of regular merge candidates are respectively tested for adding into the base candidate list for the MMVD mode. After the testing of the plurality of regular merge candidates, when the base candidate list has fewer candidates than a preset number, zero motion vector can be added as a two sided bi-prediction MMVD candidate into the base candidate list.

In some examples, after the testing of the plurality of regular merge candidates, when the base candidate list has fewer candidates than a preset number, the merge candidate that is a bi-predictor and satisfies the requirement is added into the base candidate list. In an example, the merge candidate is added as a two sided bi-prediction MMVD candidate. In another example, the merge candidate is added as a one sided bi-prediction MMVD candidate. In an example, the merge candidate is added behind other candidates in the base candidate list.

In some examples, to reconstruct the current block, a selected base (starting point) is determined from a base candidate list of the MMVD mode. In an example, a first MV offset is determined in response to the selected base is a two sided bi-prediction MMVD candidate. In another example, a second MV offset is determined in response to the selected base is a one sided bi-prediction MMVD candidate or a uni-prediction MMVD candidate. The second MV offset is different from the first MV offset. In an example, the first MV offset is larger than the second MV offset.

In an example, the first MV offset is determined according to a first table in response to the selected base is a two sided bi-prediction MMVD candidate, the first table storing first MV offsets associated with distance indices, such as Table 4. The second MV offset is determined according to a second table in response to the selected base is a one sided bi-prediction MMVD candidate or a uni-prediction MMVD candidate, the second table storing second MV offsets associated with the distance indices, such as Table 2.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
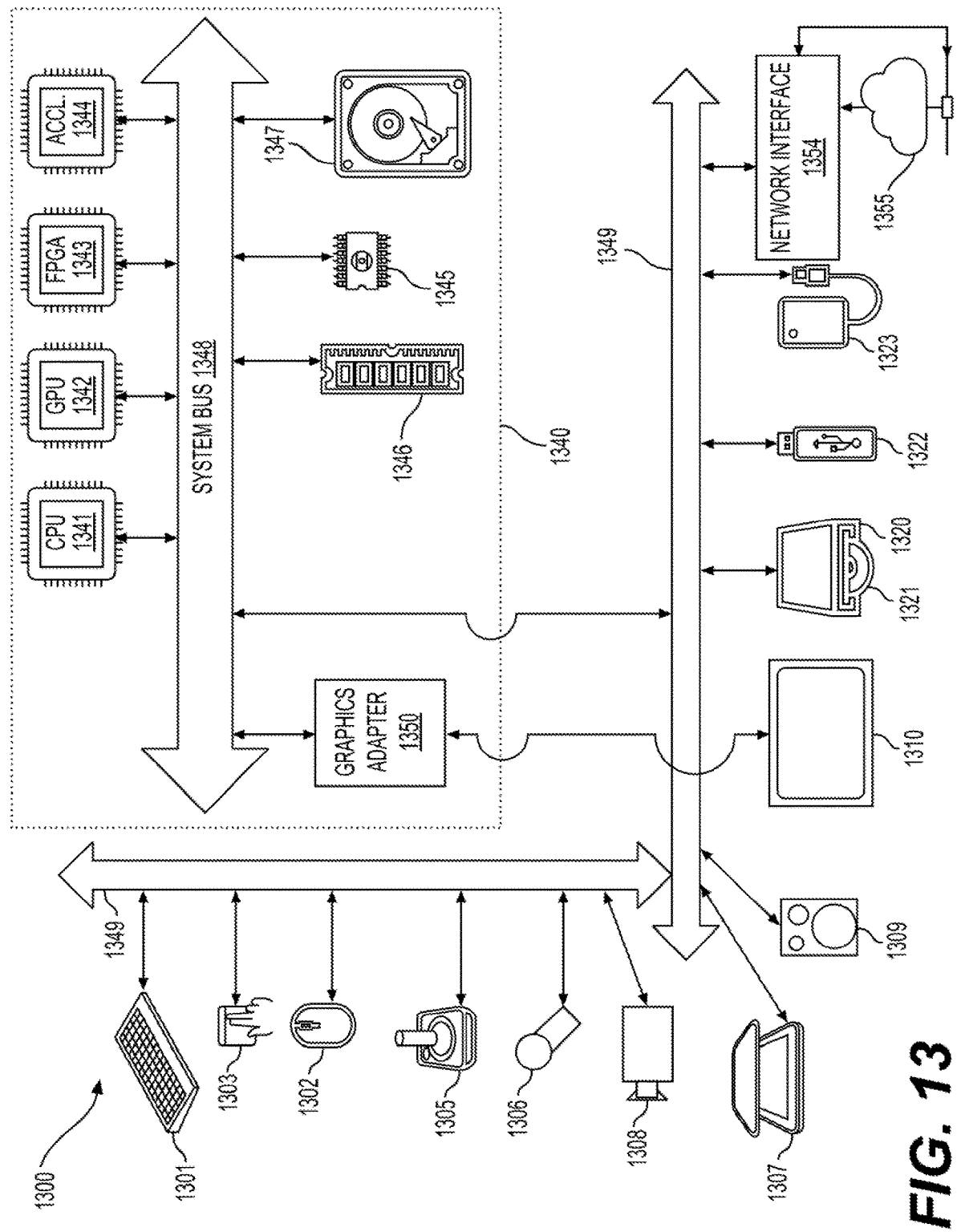
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, the method comprising:
   receiving coded information of a current block in a current picture from a coded video bitstream, the coded information including a syntax element with a value indicative of a merge with motion vector difference (MMVD) mode being applied to the current block;
   determining, when a motion vector predictor of a merge candidate is a bi-predictor, whether the merge candidate for the current block satisfies a requirement for applying a bi-prediction motion refinement that includes at least one of a decoder side motion vector refinement (DMVR) and a bi-directional optical flow (BDOF) refinement;
   when the merge candidate for the current block satisfies the requirement,
      constraining the merge candidate for use in the MMVD mode which excludes the merge candidate from a base candidate list of the MMVD mode, the base candidate list of the MMVD mode including one or more base candidates used to determine a starting point for the MMVD mode; and reconstructing the current block in the MMVD mode with the merge candidate being constrained for use in the MMVD mode; and when the merge candidate for the current block fails the requirement, adding the merge candidate into the base candidate list of the MMVD mode, wherein when the merge candidate is a uni-predictor, the merge candidate is added into the base candidate list of the MMVD mode as a uni-prediction base candidate.

2. The method of claim 1, wherein the requirement for applying the bi-prediction motion refinement comprises at least one of a first set of conditions for applying the DMVR and a second set of conditions for applying the BDOF refinement.

3. The method of claim 1, wherein the merge candidate is a regular merge candidate from a regular merge candidate list of a merge mode, the regular merge candidate list comprises a plurality of regular merge candidates, and the method comprises:

respectively testing the plurality of regular merge candidates for adding into the base candidate list for the MMVD mode;

determining that the base candidate list has fewer candidates than a preset number after the testing; and adding zero motion vector as a two sided bi-prediction base candidate into the base candidate list.

4. The method of claim 1, wherein the merge candidate for the current block is the bi-predictor and satisfies the requirement, the merge candidate is a regular merge candidate from a regular merge candidate list for a merge mode, the regular merge candidate list comprises a plurality of regular merge candidates, and the method further comprises: after the merge candidate is excluded from the base candidate list of the MMVD mode, adding the merge candidate into the base candidate list when the base candidate list has fewer candidates than a preset number.

5. The method of claim 4, wherein the adding the merge candidate into the base candidate list further comprises at least one of:

adding the merge candidate as a two sided bi-prediction base candidate; and adding the merge candidate as a one sided bi-prediction base candidate.

6. The method of claim 4, wherein the adding the merge candidate into the base candidate list further comprises:

adding the merge candidate behind other candidates in the base candidate list.

7. The method of claim 1, wherein the reconstructing the current block further comprises:

determining a selected base from the base candidate list of the MMVD mode;

determining a first MV offset when the selected base is a two sided bi-prediction base candidate;

determining a second MV offset when the selected base is a one sided bi-prediction base candidate or a uni-prediction base candidate, the second MV offset being different from the first MV offset; and reconstructing the current block based on the selected base and one of the first MV offset and the second MV offset.

8. The method of claim 1, wherein the reconstructing the current block further comprises:

determining a selected base from the base candidate list of the MMVD mode;

determining a first MV offset according to a first table when the selected base is a two sided bi-prediction base candidate, the first table storing first MV offsets associated with distance indices;

determining a second MV offset according to a second table when the selected base is a one sided bi-prediction base candidate or a uni-prediction base candidate, the second table storing second MV offsets associated with the distance indices, a first relationship between the first MV offsets and the distance indices being different from a second relationship between the second MV offsets and the distance indices; and reconstructing the current block based on the selected base and one of the first MV offset and the second MV offset.

9. The method of claim 7, wherein a magnitude of the first MV offset is larger than a magnitude of the second MV offset.

10. A method of video encoding, the method comprising:

when a motion vector predictor of a merge candidate for a current block in a current picture is a bi-predictor, determining whether the merge candidate satisfies a requirement for applying a bi-prediction motion refinement that includes at least one of a decoder side motion vector refinement (DMVR) and a bi-directional optical flow (BDOF) refinement, a merge with motion vector difference (MMVD) mode being applied to the current block;

when the merge candidate for the current block satisfies the requirement, constraining the merge candidate for use in the MMVD mode which excludes the merge candidate from a base candidate list of the MMVD mode, the base candidate list of the MMVD mode including one or more base candidates used to determine a starting point for the MMVD mode; and encoding the current block in the MMVD mode with the merge candidate being constrained for use in the MMVD mode;

when the merge candidate for the current block fails the requirement, adding the merge candidate into the base candidate list of the MMVD mode, and generating a video bitstream with coded information of the current block, the coded information indicating the MMVD mode is applied to the current block, wherein when the merge candidate is a uni-predictor, the merge candidate is added into the base candidate list of the MMVD mode as a uni-prediction base candidate.

11. The method of claim 10, wherein the requirement for applying the bi-prediction motion refinement comprises at least one of a first set of conditions for applying the DMVR and a second set of conditions for applying the BDOF refinement.

12. The method of claim 10, wherein the merge candidate is a regular merge candidate from a regular merge candidate list of a merge mode, the regular merge candidate list comprises a plurality of regular merge candidates, and the method comprises:

respectively testing the plurality of regular merge candidates for adding into the base candidate list for the MMVD mode;

determining that the base candidate list has fewer candidates than a preset number after the testing; and adding zero motion vector as a two sided bi-prediction base candidate into the base candidate list.

13. The method of claim 10, wherein the merge candidate for the current block is the bi-predictor and satisfies the requirement, the merge candidate is a regular merge candidate from a regular merge candidate list for a merge mode, the regular merge candidate list comprises a plurality of regular merge candidates, and the method further comprises: after excluding the merge candidate from the base candidate list of the MMVD mode, adding the merge candidate into the base candidate list when the base candidate list has fewer candidates than a preset number.

14. The method of claim 13, wherein the adding the merge candidate into the base candidate list further comprises at least one of:

adding the merge candidate as a two sided bi-prediction base candidate; and adding the merge candidate as a one sided bi-prediction base candidate.

15. The method of claim 13, wherein the adding the merge candidate into the base candidate list further comprises:

adding the merge candidate behind other candidates in the base candidate list.

16. The method of claim 10, wherein the encoding the current block further comprises:

determining a selected base from the base candidate list of the MMVD mode;

determining a first MV offset when the selected base is a two sided bi-prediction base candidate;

determining a second MV offset when the selected base is a one sided bi-prediction base candidate or a uni-prediction base candidate, the second MV offset being different from the first MV offset; and encoding the current block based on the selected base and one of the first MV offset and the second MV offset.

17. The method of claim 10, wherein the encoding the current block further comprises:

determining a selected base from the base candidate list of the MMVD mode;

determining a first MV offset according to a first table when the selected base is a two sided bi-prediction base candidate, the first table storing first MV offsets associated with distance indices;

determining a second MV offset according to a second table when the selected base is a one sided bi-prediction base candidate or a uni-prediction base candidate, the second table storing second MV offsets associated with the distance indices, a first relationship between the first MV offsets and the distance indices being different from a second relationship between the second MV offsets and the distance indices; and encoding the current block based on the selected base and one of the first MV offset and the second MV offset.

18. A method of processing visual media data, the method comprising:

processing a video bitstream of the visual media data according to a format rule, wherein the video bitstream includes coded information of a current block in a current picture, the coded information including a syntax element with a value indicative of a merge with motion vector difference (MMVD) mode being applied to the current block; and the format rule specifies that:

when a motion vector predictor of a merge candidate is a bi-predictor, whether the merge candidate for the current block satisfies a requirement for applying a bi-prediction motion refinement is determined, the bi-prediction motion refinement including at least one of a decoder side motion vector refinement (DMVR) and a bi-directional optical flow (BDOF) refinement;

when the merge candidate for the current block satisfies the requirement, the merge candidate for use in the MMVD mode is constrained which excludes the merge candidate from a base candidate list of the MMVD mode, the base candidate list of the MMVD mode including one or more base candidates used to determine a starting point for the MMVD mode; and the current block is reconstructed in the MMVD mode with the merge candidate being constrained for use in the MMVD mode;

when the merge candidate for the current block fails the requirement, the merge candidate is added into the base candidate list of the MMVD mode; and when the merge candidate is a uni-predictor, the merge candidate is added into the base candidate list of the MMVD mode as a uni-prediction base candidate.

* * * * *